US012210310B2

(12) United States Patent
Fujiwara et al.

(10) Patent No.: US 12,210,310 B2
(45) Date of Patent: Jan. 28, 2025

(54) IMAGE FORMING APPARATUS HAVING A CONNECTOR THAT ELECTRICALLY CONNECTS A FIXING UNIT TO A CIRCUIT BOARD HAVING A POWER CONTROL CIRCUIT

(71) Applicant: CANON KABUSHIKI KAISHA, Tokyo (JP)

(72) Inventors: Yuji Fujiwara, Yokohama (JP); Ryota Ogura, Numazu (JP); Keigo Akiya, Tokyo (JP); Teruhiko Namiki, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/343,933

(22) Filed: Jun. 29, 2023

(65) Prior Publication Data

US 2023/0341798 A1 Oct. 26, 2023

Related U.S. Application Data

(63) Continuation of application No. 17/583,341, filed on Jan. 25, 2022, now Pat. No. 11,768,454, which is a
(Continued)

(30) Foreign Application Priority Data

Nov. 9, 2018 (JP) ................................ 2018-211664
Nov. 15, 2018 (JP) ................................ 2018-214524
Oct. 29, 2019 (JP) ................................ 2019-196146

(51) Int. Cl.

| | |
|---|---|
| ***G03G 15/20*** | (2006.01) |
| ***G03G 15/00*** | (2006.01) |
| ***G03G 21/16*** | (2006.01) |

(52) U.S. Cl.
CPC ......... *G03G 15/80* (2013.01); *G03G 15/2053* (2013.01); *G03G 21/1652* (2013.01);
(Continued)

(58) Field of Classification Search
CPC ............... G03G 15/2039; G03G 15/80; G03G 15/5004; G03G 15/2017; G03G 15/2053;
(Continued)

(56) References Cited

U.S. PATENT DOCUMENTS 6,259,073 B1 7/2001 Inukai
9,423,736 B2 8/2016 Nakayama
(Continued)

FOREIGN PATENT DOCUMENTS

CN 103676575 A 3/2014
CN 105319913 A 2/2016
(Continued)

OTHER PUBLICATIONS

Japanese Office Action dated Aug. 1, 2023 in counterpart Japanese Patent Application No. 2019-196146.
(Continued)

*Primary Examiner* — Robert B Beatty
(74) *Attorney, Agent, or Firm* — Venable LLP

(57) ABSTRACT

An image forming apparatus of the present invention includes a circuit including both a circuit within a fixing unit and a power control circuit, provided with a first circuit which supplies power to a heater from an AC power supply, a second circuit electrically insulated from the first circuit, and a third circuit electrically insulated from both the first circuit and the second circuit, all of the first to third circuits are provided on at least one surface of a circuit board, and the first to third circuits are disposed on at least one straight line on which all of the first to third circuits are present on
(Continued)

the one surface of the circuit board in the order of the first circuit, the third circuit and the second circuit.

4 Claims, 9 Drawing Sheets

Related U.S. Application Data continuation of application No. 17/078,405, filed on Oct. 23, 2020, now Pat. No. 11,262,677, which is a continuation of application No. 16/676,944, filed on Nov. 7, 2019, now Pat. No. 10,845,741.

(52) U.S. Cl.
CPC ..... *G03G 21/1685* (2013.01); *G03G 15/2039* (2013.01); *G03G 2221/1639* (2013.01); *G03G 2221/166* (2013.01)

(58) Field of Classification Search
CPC ........... G03G 21/1652; G03G 21/1685; G03G 2221/1639; G03G 2221/166; H05B 1/0241; H05B 3/0066
USPC ........................ 399/69, 88, 90, 122; 219/216
See application file for complete search history.

(56) References Cited

U.S. PATENT DOCUMENTS

| | | | | |
|---|---|---|---|---|
| 9,429,894 | B2 * | 8/2016 | Mashiki | G03G 15/80 |
| 9,497,802 | B2 | 11/2016 | Nakayama | |
| 9,915,918 | B2 * | 3/2018 | Nanai | G03G 21/1889 |
| 10,416,595 | B2 | 9/2019 | Ogura et al. | |
| 10,459,379 | B2 | 10/2019 | Shimura | |
| 2006/0024071 | A1 * | 2/2006 | Takami | G03G 15/2039 399/33 |
| 2006/0291891 | A1 * | 12/2006 | DeMoor | G03G 15/5004 399/88 |
| 2007/0047991 | A1 | 3/2007 | Itoh et al. | |
| 2007/0242959 | A1 * | 10/2007 | Aono | G03G 15/5004 399/13 |
| 2008/0118265 | A1 | 5/2008 | Kinouchi et al. | |
| 2008/0124098 | A1 * | 5/2008 | Yoshimoto | G03G 15/55 399/33 |
| 2008/0260407 | A1 | 10/2008 | Takagi et al. | |
| 2009/0003868 | A1 | 1/2009 | Namiki et al. | |
| 2010/0150595 | A1 | 6/2010 | Harris | |
| 2011/0299868 | A1 | 12/2011 | Ito | |
| 2013/0266333 | A1 | 10/2013 | Fujiwara | |
| 2015/0338806 | A1 | 11/2015 | Nakayama | |
| 2016/0259279 | A1 * | 9/2016 | Nakano | G03G 15/2039 |
| 2017/0075266 | A1 | 3/2017 | Mochizuki et al. | |
| 2017/0102650 | A1 * | 4/2017 | Shimura | H05B 3/03 |
| 2017/0106666 | A1 * | 4/2017 | Berke | G03G 15/80 |
| 2018/0032009 | A1 * | 2/2018 | Ogura | G03G 15/2028 |
| 2018/0145672 | A1 * | 5/2018 | Shimizu | H03K 17/14 |
| 2019/0155199 | A1 | 5/2019 | Saito et al. | |
| 2019/0222112 | A1 | 7/2019 | Sakai | |
| 2020/0081377 | A1 | 3/2020 | Shimura et al. | |

FOREIGN PATENT DOCUMENTS

| | | | | |
|---|---|---|---|---|
| CN | 105319914 | A | 2/2016 | |
| JP | 04-331959 | A | 11/1992 | |
| JP | 11-194837 | A | 7/1999 | |
| JP | H11-344882 | A | 12/1999 | |
| JP | 2000-010434 | A | 1/2000 | |
| JP | 2001223064 | A | 8/2001 | |
| JP | 2002170649 | A | 6/2002 | |
| JP | 2002-258640 | A | 9/2002 | |
| JP | 2005315961 | A | 11/2005 | |
| JP | 2006258877 | A | 9/2006 | |
| JP | 2007336644 | A | 12/2007 | |
| JP | 2008209718 | A | 9/2008 | |
| JP | 2015-225137 | A | 12/2015 | |
| JP | 2017-054071 | A | 3/2017 | |
| JP | 201749935 | A | 3/2017 | |
| JP | 2017-138431 | A | 8/2017 | |
| JP | 2018-080992 | A | 5/2018 | |
| JP | 2018-146957 | A | 9/2018 | |
| WO | WO-2018123855 | A1 * | 7/2018 | G03G 15/2042 |

OTHER PUBLICATIONS

Jul. 5, 2022 Office Action in Chinese Patent Application No. 201911084529.5 (with English translation).
Chinese Office Action issued May 29, 2024 in counterpart Chinese Patent Appln. No. 202310514537.9.

* cited by examiner

IMAGE FORMING APPARATUS HAVING A CONNECTOR THAT ELECTRICALLY CONNECTS A FIXING UNIT TO A CIRCUIT BOARD HAVING A POWER CONTROL CIRCUIT

CROSS-REFERENCE TO RELATED APPLICATIONS

This application is a Continuation of U.S. patent application Ser. No. 17/583,341, filed Jan. 25, 2022, which is a Continuation of U.S. patent application Ser. No. 17/078,405, filed Oct. 23, 2020, now issued as U.S. Pat. No. 11,262,677 on Mar. 1, 2022, which is a Continuation of U.S. patent application Ser. No. 16/676,944, filed Nov. 7, 2019, now issued as U.S. Pat. No. 10,845,741 on Nov. 24, 2020, which claims the benefit of Japanese Patent Application No. 2018-214524, filed Nov. 15, 2018, Japanese Patent Application No. 2018-211664, filed Nov. 9, 2018, and Japanese Patent Application No. 2019-196146, filed Oct. 29, 2019. The entire contents of these applications are hereby incorporated by reference herein.

BACKGROUND OF THE INVENTION

Field of the Invention

The present invention relates to an image forming apparatus such as a copying machine, a printer or the like using an electrophotographic system or an electrostatic recording system.

Description of the Related Art

There is a configuration including a cylindrical film, a plate-shaped heater in contact with the inner surface of the film, and a roller which forms a nip part with respect to the heater via the film as a fixing unit mounted in an image forming apparatus. Further, a configuration for detecting the temperature of the nip part with high accuracy by providing a thermistor on the side of a surface of a heater substrate which comes into contact with the film is disclosed in Japanese Patent Application Publication No. H11-194837.

However, when the configuration in which the thermistor is provided on the side of the surface of the heater substrate which comes into contact with the film is employed, it is necessary to secure a dielectric breakdown voltage. To this end, a configuration in which a temperature detection circuit electrically connected to a thermistor is electrically insulated from both of a primary side circuit (first potential group) electrically connected to a commercial power supply and a secondary side circuit (second potential group) electrically insulated from the primary side circuit has been conceived.

However, when the first potential group, the second potential group, and a potential group in which the temperature detection circuit is provided are mixed within a circuit board, the size of the circuit board increases because a distance between potential groups needs to be secured. Increase in size of the circuit board is disadvantageous for reducing the size of the image forming apparatus.

SUMMARY OF THE INVENTION

The present invention provides an image forming apparatus for forming a toner image on a recording material, comprising:

a fixing unit which has a heater for generating heat according to power supplied from an AC power supply and thermally fixes a toner image formed on a recording material onto the recording material; and a circuit board provided with a power control circuit for controlling power supplied to the heater, wherein a circuit including both a circuit within the fixing unit and the power control circuit is provided with a first circuit which supplies power to the heater from the AC power supply, a second circuit electrically insulated from the first circuit, and a third circuit electrically insulated from both the first circuit and the second circuit, wherein all of the first to third circuits are provided on at least one surface of the circuit board, and wherein the first to third circuits are disposed on at least one straight line on which all of the first to third circuits are present on the one surface of the circuit board in the order of the first circuit, the third circuit, and the second circuit.

The present invention provides a n image forming apparatus for forming a toner image on a recording material, comprising:

a fixing unit which has a heater for generating heat according to power supplied from an AC power supply and thermally fixes a toner image formed on a recording material onto the recording material; and a circuit board provided with a power control circuit for controlling power supplied to the heater, wherein a circuit including both a circuit within the fixing unit and the power control circuit is provided with a first circuit which supplies power to the heater from the AC power supply, a second circuit electrically insulated from the first circuit, and a third circuit electrically insulated from both the first circuit and the second circuit, and wherein the first circuit is disposed on a first surface of the circuit board, the second circuit is disposed on a second surface which is a rear surface with respect to the first surface, and the third circuit is disposed on at least one of the first and second surfaces.

The present invention provides an image forming apparatus for forming a toner image on a recording material, comprising:

an apparatus main body including an image forming part which forms a toner image on a recording material;

a fixing unit which has a heater for generating heat according to power supplied from an AC power supply and thermally fixes a toner image formed on a recording material onto the recording material, the fixing unit being detachably attached to the apparatus main body;

a circuit board provided with a power control circuit for controlling power supplied to the heater is provided; and at least one connector which electrically connects the fixing unit to the power control circuit, wherein a circuit including both a circuit within the fixing unit and the power control circuit is provided with a first circuit which supplies power to the heater from the AC power supply, a second circuit electrically insulated from the first circuit, and a third circuit electrically insulated from both the first circuit and the second circuit, and wherein the first to third circuits are arranged in the connector in the order of the first circuit, the third circuit and the second circuit.

Further features of the present invention will become apparent from the following description of exemplary embodiments (with reference to the attached drawings).

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments.

Embodiment 1

Figure 1:
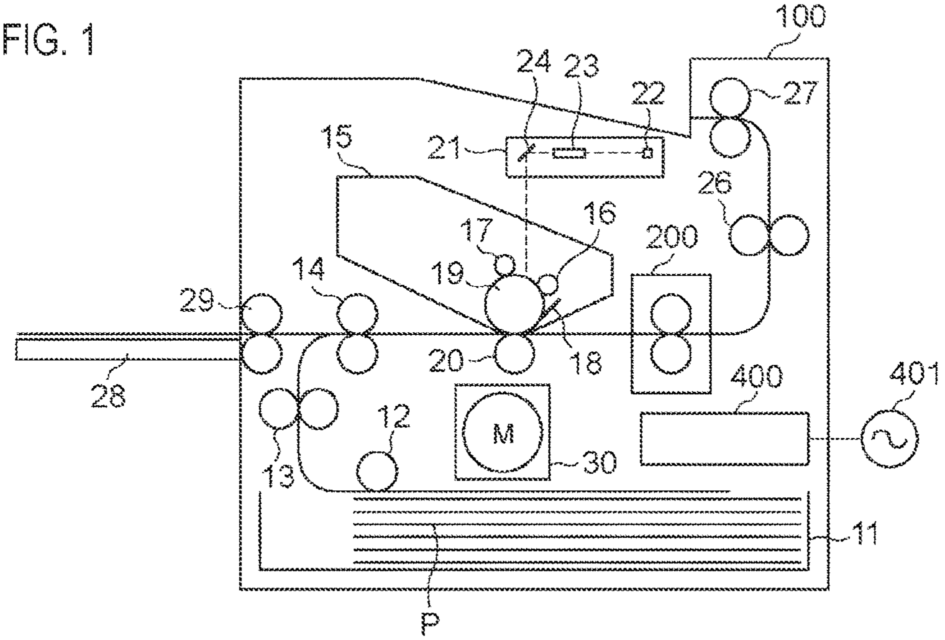
FIG. 1 is a cross-sectional view of an image forming apparatus.

FIG. 1 is a cross-sectional view of an image forming apparatus (laser printer) 100 using electrophotographic recording technology. When a print signal is generated, a laser beam modulated depending on image information is projected by a scanner unit 21 and scans a photosensitive member (photosensitive drum) 19 charged to a predetermined polarity through a charging roller 16. Accordingly, an electrostatic latent image is formed on the photosensitive member 19. Toner is supplied to this electrostatic latent image from a developing device 17 to form a toner image depending on the image information on the photosensitive member 19.

18 denotes a cleaner which cleans the photosensitive member 19. In the present embodiment, a developing unit including the photosensitive member 19, the charging roller 16 and the developing device 17 including a developing roller, and a cleaning unit including the cleaner 18 are configured to be able to be attached/detached to/from the apparatus main body of the image forming apparatus 100 as a process cartridge 15. A recording material P such as plain paper loaded on a paper cassette 11 is fed one sheet at a time by a pickup roller 12 and transported by a roller 13 to a register roller 14. Further, the recording material P is transported from the register roller 14 to a transfer position formed by the photosensitive member 19 and a transfer roller 20 in accordance with a timing at which the toner image on the photosensitive member 19 arrives at the transfer position. The toner image on the photosensitive member 19 is transferred to the recording material P in a process in which the recording material P passes through the transfer position. Thereafter, the recording material P is heated in the fixing unit 200 and the toner image is thermally fixed on the recording material P. The recording material P having the toner image fixed thereon is discharged to a tray on the image forming apparatus 100 according to rollers 26 and 27.

28 denotes a paper feed tray (manual feed tray) having a pair of recording material regulating plates having widths that are adjustable in response to the size of the recording material P. 29 denotes a pickup roller which feeds the recording material P from the paper feed tray 28 and 30 denotes a motor which drives the fixing unit 200 and the like. The fixing unit 200 is detachably attached to the image forming apparatus 100. Power is supplied from a power control circuit 400 connected to a commercial AC power supply 401 to the fixing unit 200. The above-described photosensitive member 19, charging roller 16, scanner unit 21, developing device 17 and transfer roller 20 constitutes an image forming part which forms an unfixed image on the recording material P. The scanner unit includes a semiconductor laser 22 which emits light in response to image information, a polygon minor 23 which deflects a laser beam, and a mirror 24 which reflects the deflected laser beam toward the photosensitive member 19.

Figure 2:
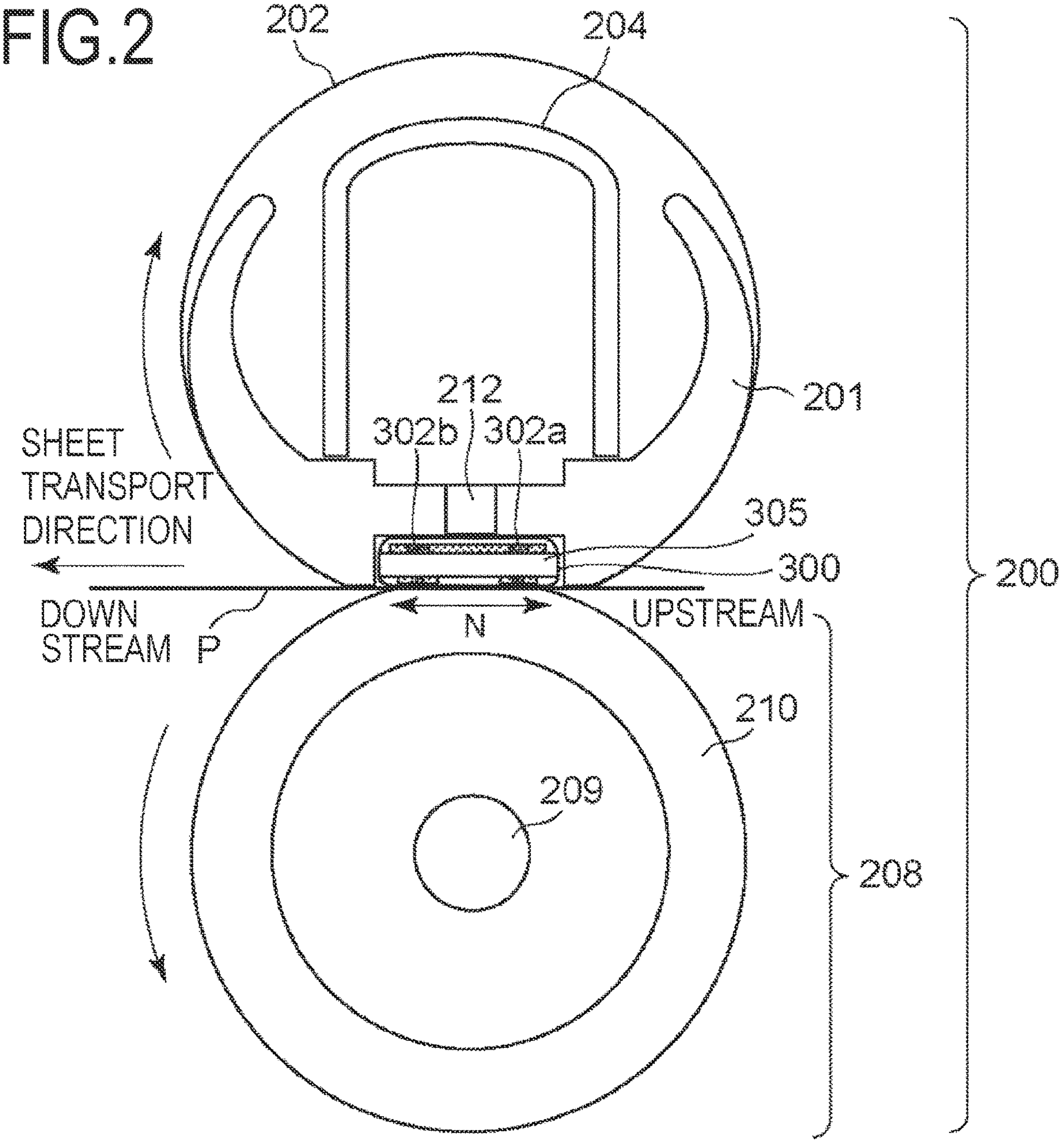
FIG. 2 is a cross-sectional view of a fixing unit.
Figure 4:
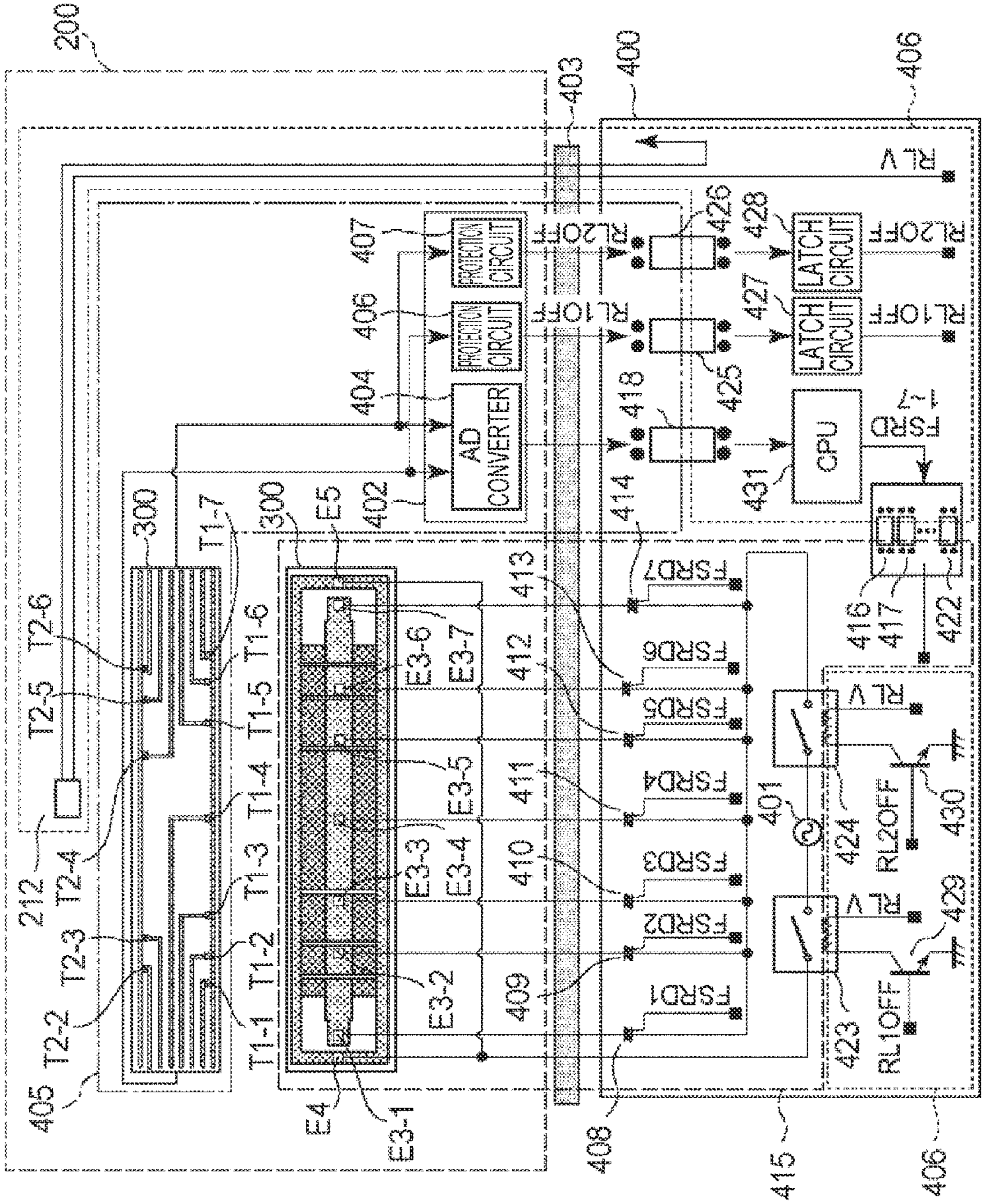
FIG. 4 is a diagram illustrating a fixing unit and a power control circuit in embodiment 1.

FIG. 2 is a cross-sectional view of the fixing unit 200 which thermally fixes a toner image formed on a recording material on the recording material. The fixing unit 200 includes a cylindrical film 202, a heater 300 in contact with the inner surface of the film 202, and a pressure roller (nip part formation member) 208 which forms a fixing nip part N with respect to the heater 300 via the film 202. The heater 300 generates heat according to power supplied from the AC power supply 401 (FIG. 4). A sheet of recording material carrying a toner image is pinched and transported through the fixing nip part.

The film 202 includes a base layer made of a heat-resistant resin such as polyimide or a metal such as stainless steel, and a surface layer made of fluororesin. An elastic layer made of silicone rubber or the like may be provided between the base layer and the surface layer.

A pressure roller 208 includes a cored bar 209 made of a metal such as iron or aluminum, and an elastic layer 210 made of silicone rubber or the like.

The heater 300 is held by a holding member (heater holder) 201 made of a heat-resistant resin such as a liquid crystal polymer. The holding member 201 also has a guide function of guiding rotation of the film 202. The holding member 201 is reinforced by a metallic stay 204. The pressure of a spring (not shown) for forming the fixing nip part N by applying a pressure between the pressure roller 208 and the spring is applied to the stay 204. The pressure roller 208 receives power from the motor 30 (refer to FIG. 1) to rotate in an arrow direction. The film 202 is driven to rotate according to rotation of the pressure roller 208. The recording material P carrying an unfixed toner image is heated and fixed while being pinched and transported through the fixing nip part N.

The heater 300 includes a ceramic (insulating) substrate 305 and heating elements (heating resistors) 302*a* and 302*b* printed on the substrate 305. A protection element 212 such as a thermo switch or a temperature fuse is in contact with the heater 300. The protection element 212 interrupts power supplied to the heater 300 by turning off a switch provided therein when the heater 300 generates heat abnormally.

Figure 3A:
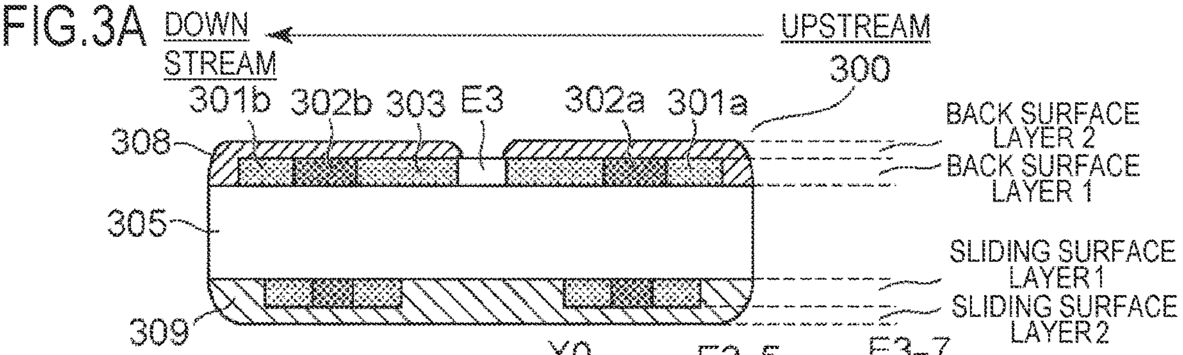
FIGS. 3A and 3B are diagrams illustrating a configuration of a heater in embodiment 1.
Figure 3B:
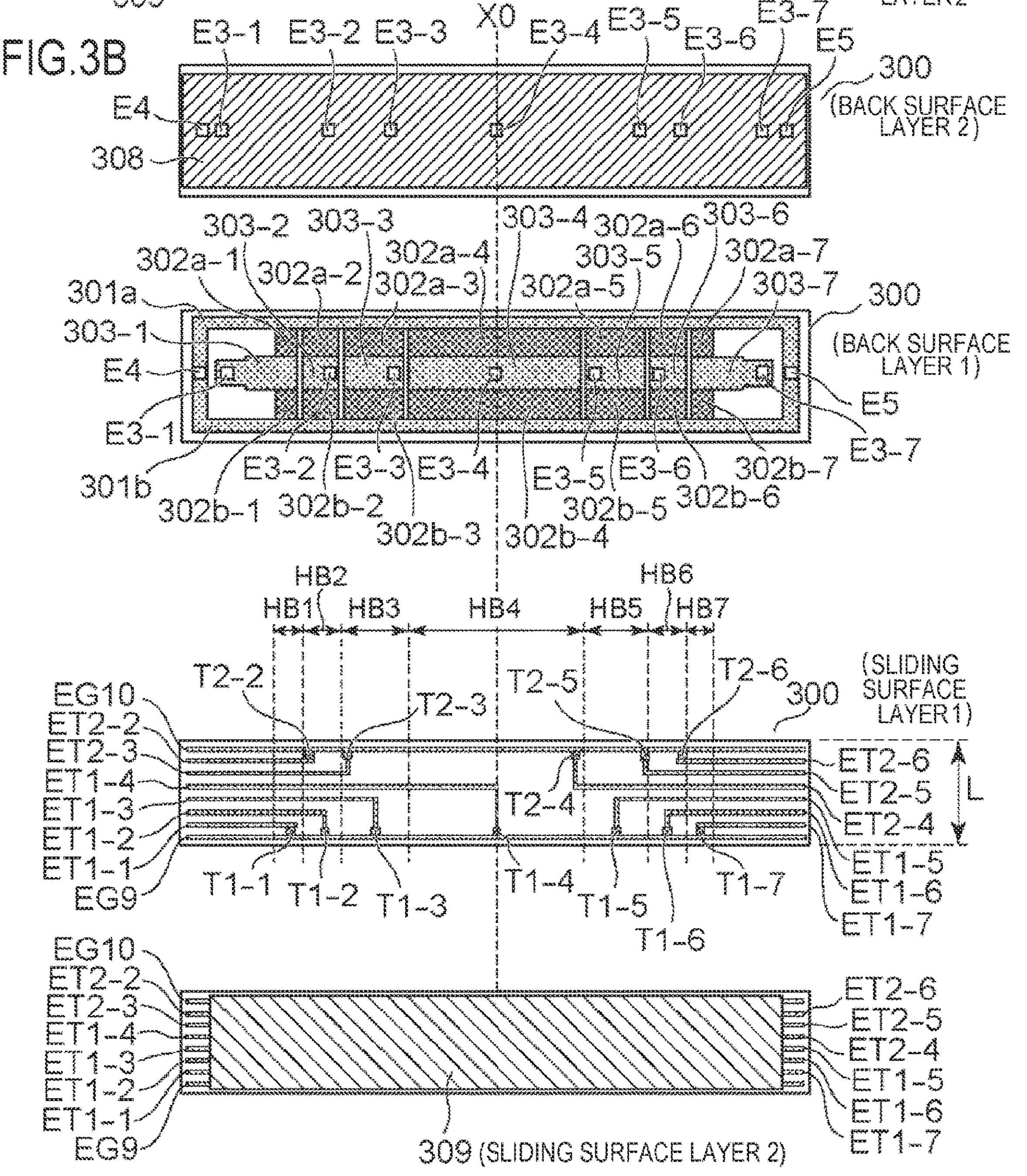

FIG. 3A is a cross-sectional view of the heater 300 at a transport reference position X0 on the recording material P shown in FIG. 3B. The heater 300 includes sliding surface layers 1 and 2 that are surfaces on the side on which the inner surface of the film 202 slides on the basis of the substrate 305, and back surface layers 1 and 2 that are surfaces on the side opposite to the sliding surface layers 1 and 2.

Semiconductors 301 and 303 are provided on the back surface layer 1 of the heater 300. The semiconductor 301 is divided into a semiconductor 301*a* disposed on the upstream side of a transport direction of the recording material P and a semiconductor 301*b* disposed on the downstream side thereof. A heating element 302 which is disposed between the semiconductors 301 and 303 and generates heat using power supplied through the semiconductors 301 and 303 is also provided on the back surface layer 1. The heating element 302 is divided into a heating element 302*a* disposed on the upstream side of the transport direction of the recording material P and a heating element 302*b* disposed on the downstream side thereof. Further, an electrode E3 to which a power supply terminal (not shown) outside the heater 300 is connected is provided on the back surface layer 1. A protection layer 308 made of insulating glass is provided on the back surface layer 2 of the heater 300. The protection layer 308 covers an area other than the electrode E3 and an electrode E4 which will be described later.

FIG. 3B is plan views of the heater 300 at the back surface layer 2, back surface layer 1 and sliding surface layer 1. Seven heating blocks HB1 to HB7 composed of sets of the semiconductor 301, the semiconductor 303, the heating element 302 and the electrode E3 are provided on the back surface layer 1 in the longitudinal direction of the heater 300. In the figure, numeral 302*a*-1 denotes a heating element 302*a*-1 in the heating block HB1, numeral 302*a*-2 denotes a heating element 302*a*-2 in the heating block HB2, and a final number denotes a corresponding heating block. The same applies to the numerals denoted at to the ends of the heating element 302*b*, the semiconductor 303 and the electrode E3. Signs E4 and E5 denote electrodes. One side of the heating element 302 is electrically connected to the electrode E3 and the other side thereof is electrically connected to the electrodes E4 and E5.

The protection layer 308 is provided in an area other than the areas of electrodes E3-1 to E3-7, E4 and E5. The power supply terminal (not shown) outside the heater 300 is connected to the electrodes E3-1 to E3-7, E4 and E5 from the backside of the heater 300. The seven heating blocks HB1 to HB7 are independently controlled.

Thermistors (temperature detection elements) T1-1 to T1-7 and T2-2 to T2-6 for detecting the temperature of the heater 300 are provided on the sliding surface layer 1. The thermistors T1-1 to T1-7 (main thermistors) are respectively provided on the seven heating blocks HB1 to HB7. The main thermistors T1-1 to T1-7 are chiefly used for temperature control of the heating blocks HB1 to HB7. Accordingly, the main thermistors T1-1 to T1-7 are provided approximately at centers of the heating blocks HB1 to HB7 in the longitudinal direction of the heater 300.

The thermistors T2-2 to T2-6 (sub-thermistors) are respectively provided on five heating blocks HB2 to HB6. The sub-thermistors T2-2 to T2-6 are provided in order to detect the temperature of a non-paper passing area of the heater 300 in a case of printing on a sheet of recording material P with a narrow width. Accordingly, the sub-thermistors T2-2 to T2-6 are respectively disposed in proximity to positions of the heating blocks HB1 to HB7 which are farthest from the transport reference position X0 in the longitudinal direction of the heater 300. The heating blocks HB1 and HB7 have narrow areas in the longitudinal direction of the heater 300 and thus thermistors are omitted therein.

The terminal of one side of each of the main thermistors T1-1 to T1-7 is connected to each of conductors ET1-1 to ET1-7 for resistance value detection and the terminal of the other side is connected to a common conductor EG9. The terminal of one side of each of the sub-thermistors T2-2 to T2-6 is connected to each of conductors ET2-2 to ET2-6 for resistance value detection and the terminal of the other side is connected to a common conductor EG10. Although the width (the length in the direction of the shortest dimension of the heater 300) L of the heater 300 increases when the number of thermistors increases, increase in size of the heater 300 is prevented according to efforts such as employing the common conductors EG9 and EG10.

A protection layer 309 coated with a material such as glass is provided on the sliding surface layer 2 of the heater 300. The protection layer 309 covers all main thermistors, all sub-thermistors and all conductors such that the edges of all of the conductors ET1-1 to ET1-7, ET2-2 to ET2-6, EG9 and EG10 in the longitudinal direction of the heater 300 are exposed.

FIG. 4 illustrates the fixing unit 200 and the power control circuit 400. There is a first potential group (first circuit) 415 that is a primary side circuit for supplying power from the AC power supply 401 to the heater 300 (heating elements 302*a* and 302*b*) as a circuit including a circuit within the fixing unit 200 and the power control circuit 400. In addition, there is a second potential group (second circuit) 406 that is a secondary side circuit which is electrically insulated from the first potential group 415 and controls power supplied to the heater 300. The first circuit 415 is a circuit that cannot be touched by a user. The second circuit 406 is a circuit having electrical components and wires that can be touched by the user. For example, an electrical component such as an interface cable used for connection to an external apparatus such as a PC is also included in the second circuit 406 because it can be touched by a user. Further, there is a third potential group (third circuit) 405 insulated from both the first potential group 415 and the second potential group 406. The third circuit 405 is a circuit that does not have electrical components or wires that can be touched by a user (that cannot be touched by a user). In view of this, the third circuit 405 differs from the second circuit 406.

When the heater 300 has broken due to abnormal heat generation of the heater 300, or the like, the first potential group 415 such as the electrodes E3-1 to E3-7, E4 and E5 and the heating elements 302*a* and 302*b* may be electrically connected to the thermistors T1-1 to T1-7 and T2-2 to T2-6. Accordingly, the present embodiment provides a configuration in which insulation from the user or the second potential group 406 is secured even when both are electrically connected to each other. Specifically, the third potential group 405 including the thermistors T1-1 to T1-7 and T2-2 to T2-6 and the temperature detection circuit 402 is electrically insulated from the first potential group 415 and the second potential group 406.

The fixing unit 200 is detachably attached to the main body of the printer 100. The fixing unit 200 is electrically connected to the main body of the printer 100 through a connector 403.

Next, the circuits in the first potential group 415 will be described. In the power control circuit 400, the commercial AC power supply 401 is connected to the connector 403 through relays 423 and 424 and triacs 408 to 414. In the fixing unit 200, a power supply line from the connector 403 is connected to the electrodes E3-1 to E3-7, E4 and E5 of the heater 300.

Next, circuits in the third potential group 405 will be described. In the fixing unit 200, signal lines via the conductors ET1-1 to ET1-7, ET2-2 to ET2-6, EG9 and EG10 of the thermistors T1-1 to T1-7 and T2-2 to T2-6 are connected to an AD converter 404 and protection circuits 406 and 407 provided in the temperature detection circuit 402. In FIG. 4, the signal lines are illustrated as two lines for simplification of the figure. The AD converter 404 connects the signal lines of the plurality of temperature detection elements and converts analog signals of the thermistors T1-1 to T1-7 and T2-2 to T2-6 into a digital signal. In order to reduce the number of connection pins of the connector 403, for example, data communication such as UART communication is used. The connector 403 is connected to the power control circuit 400. Hence, the number of signal lines extended from the AD converter 404 to the central processing unit is less than the number of signal lines of the plurality of temperature detection elements. In one embodiment as illustrated in FIG. 4, the number of signal lines extended from the AD converter 404 is one, and the signal line is connected to the power control circuit 400 via the connector 403. In the power control circuit 400, signal lines (third potential group) connected to the connector 403 are connected to the second potential group 406 electrically insulated from both the third potential group 405 and the first potential group 415 through an insulating coupler (photo-triac coupler) 418. The protection circuits 406 and 407 output a signal RL1OFF and a signal RL2OFF when analog signals of the thermistors T1-1 to T1-7 and T2-2 to T2-6 exceed a predetermined threshold value to interrupt power supply to the heater 300. A signal line for the signal RL1OFF and a signal line for the signal RL2OFF are connected to the connector 403 and connected to the power control circuit 400 after that. In the inside of the power control circuit 400, each signal line is connected to latch circuits 427 and 428 through insulating couplers 425 and 426.

Finally, circuits in the second potential group 406 will be described. A signal via the insulating coupler 418 is input to a CPU 431. The CPU 431 determines the power necessary for the heating blocks HB1 to HB7 to maintain target temperatures respectively set therefor, for example, using PID control on the basis of received signals of the main thermistors T1-1 to T1-7. The CPU 431 transmits signals FSRD1 to FSRD7 to the triacs 408 to 414 such that the determined power is supplied to the heating blocks HB1 to HB7. Insulation between the second potential group 406 and the first potential group 415 is secured using photo-triac couplers 416 to 422 in order to transmit the signals FSRD1 to FSRD7 from the second potential group 406 to the first potential group 415. The latch circuits 427 and 428 are circuits for fixing the logic of the signal RL1OFF and the signal RL2OFF to OFF when the temperatures of the sub-thermistors T2-2 to T2-6 reach at least a predetermined temperature. The signal lines for the signal RL1OFF and the signal RL2OFF output from the latch circuits 427 and 428 are respectively connected to the transistors 429 and 430. In addition, the signal lines are configured to block current flowing through coils of the relays 423 and 424. The protection element 212 is provided in the fixing unit 200 and a power source on the power control circuit 400 is connected to the protection element 212 through the connector 403. A power source via the protection element 212 is connected to a power source of the coils of the relays 423 and 424 through the connector 403. Accordingly, when the protection element 212 is turned OFF due to abnormal heat generation of the heater 300, power is not supplied to the coils of the relays 423 and 424. Power supply to the heater 300 is interrupted when the relays 423 and 424 are turned OFF.

As illustrated in FIG. 4, the power control circuit 400 has a configuration in which the first potential group 415, the second potential group 406 and the third potential group 405 are mixed. The relays 423 and 424 across the second potential group and the first potential group secure insulation therebetween according to the internal structure of the relays 423 and 424.

Figure 5A:
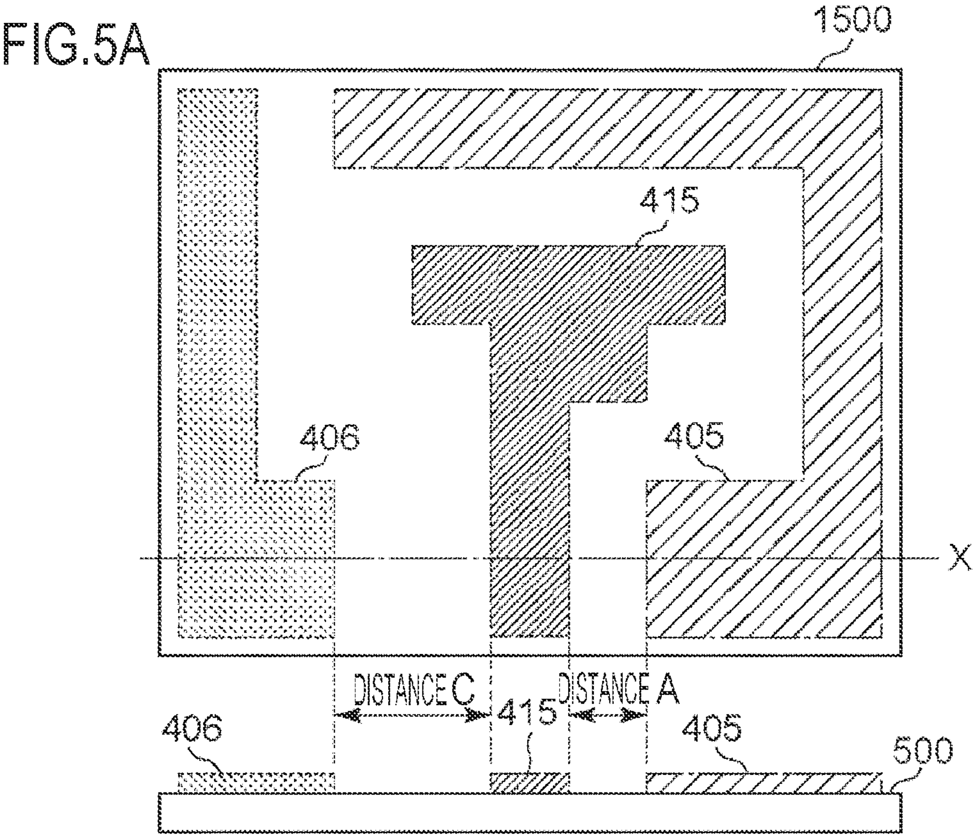
FIGS. 5A and 5B are diagrams illustrating a configuration of a circuit board in embodiment 1.
Figure 5B:
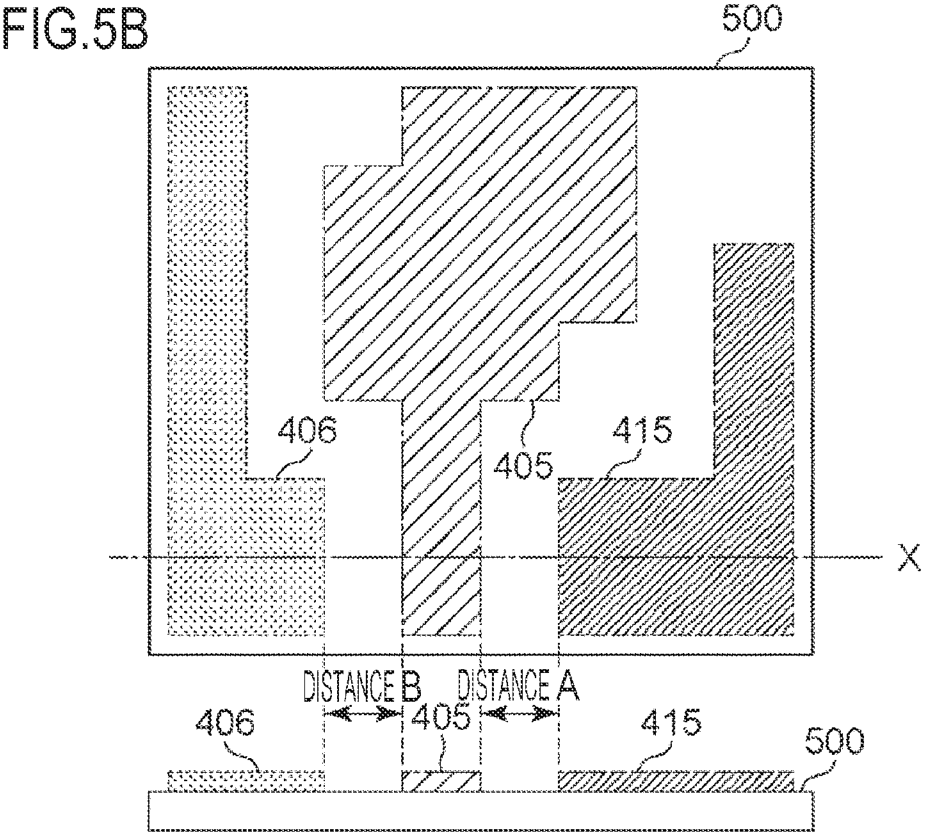

FIGS. 5A and 5B are plan views of a circuit board 500 on which the power control circuit 400 is mounted. The circuit board 500 has a configuration in which the first potential group 415, the second potential group 406 and the third potential group 405 are mixed. Specifically, all of the three potential groups (first to third circuits) 415, 406 and 405 are provided on at least one surface of the circuit board 500. In the circuit in which the first potential group 415 and the second potential group 406 are mixed, a distance C between the first potential group 415 and the second potential group 406 needs to be a distance that satisfies reinforced insulation in safety requirements (IEC60950-1 and IEC62368-1). On the other hand, a distance A between the first potential group 415 and the third potential group 405 and a distance B between the third potential group 405 and the second potential group 406 may be distances that secure basic insulation in the safety requirements. The distances have relations of distance C>distance A and distance C>distance B. Here, basic insulation is insulation carried out for basic protection from electric shock. Double insulation is carrying out additional insulation which performs protection for the basic insulation when the basic insulation fails. Reinforced insulation is single insulation which provides the same degree of protection against electric shock as that of the double insulation. In the present embodiment, reinforced insulation and double insulation are collectively referred to as reinforced insulation.

FIG. 5A is a plan view illustrating an arrangement of potential groups on a circuit board 1500 and a cross-sectional view at a position of a straight line X in comparative example 1. All of the first potential group 415, the second potential group 406 and the third potential group 405 are present on the straight line X, and the second potential group 406, the first potential group 415 and the third potential group 405 are sequentially disposed from the left side of FIGS. 5A and 5B. In this arrangement, distances between potential groups necessary to secure insulation between potential groups are the distance C and the distance A (<distance C). Particularly, the distance C needs to be increased because the first potential group 415 and the second potential group 406 adjoin. Since the distance between the first potential group 415 and the third potential group 405 also requires the distance A for basic insulation, a total distance necessary for insulation is the distance A+distance C.

FIG. 5B is a plan view illustrating an arrangement of the potential groups on the circuit board 500 and a cross-sectional view at the position of the straight line X in embodiment 1. All of the first potential group 415, the second potential group 406 and the third potential group 405 are present on the straight line X, and the second potential group 406, the third potential group 405 and the first potential group 415 are sequentially disposed from the left side of FIGS. 5A and 5B. That is, the first to third circuits are disposed in the order of the first circuit 415, the third circuit 405 and the second circuit 406 on at least one straight line on which all of the first to third circuits 415, 406 and 405 are present on one surface of the circuit board 500. In this arrangement, distances between potential groups necessary to secure insulation between potential groups are the distance B (<distance C) and the distance A (<distance C). The distance between the second potential group 406 and the third potential group 405 may be the distance B (<distance C) because merely basic insulation is required therebetween, and the distance between the first potential group 415 and the third potential group 405 may be the distance A (<distance C) because merely basic insulation is also required therebetween. Further, if (distance A+distance B)≥distance C is satisfied, reinforced insulation required between the first potential group 415 and the second potential group 406 can be secured. Accordingly, a distance A+C necessary for insulation in the circuit board 500 of embodiment 1 can be reduced to below a distance A+C necessary for insulation in the circuit board 1500 of comparative example 1 and the area of the circuit board 500 can be reduced to below that of comparative example 1.

As described above, the apparatus of the present embodiment includes the first potential group 415 having the circuit which supplies power from the AC power supply 401 to the heater 300 and the second potential group 406 electrically insulated from the first potential group 415 which are provided on the circuit including the fixing unit 200 and the circuit board 500. In addition, the third potential group 405 insulated from both the first potential group 415 and the second potential group 406 is provided. Further, all of the three potential groups 415, 406 and 405 are disposed on at least one surface of the circuit board 500. The three potential groups 415, 406 and 405 are disposed in the order of the first potential group 415, the third potential group 405 and the second potential group 406 on at least one straight line on which all of the three potential groups 415, 406 and 405 are present.

Although potential groups of three types do not have to be present on any straight line on the circuit board 500, it is desirable that three potential groups be so disposed such that each potential group of three types is present only at a place in order to reduce the area of the board when three types are present. Furthermore, a configuration in which the three potential groups are disposed in the order of the first potential group 415, the third potential group 405 and the second potential group 406 on all straight lines on which all of the three potential groups (first to third circuits) 415, 406 and 405 are present is more desirable.

Embodiment 2

Figure 6A:
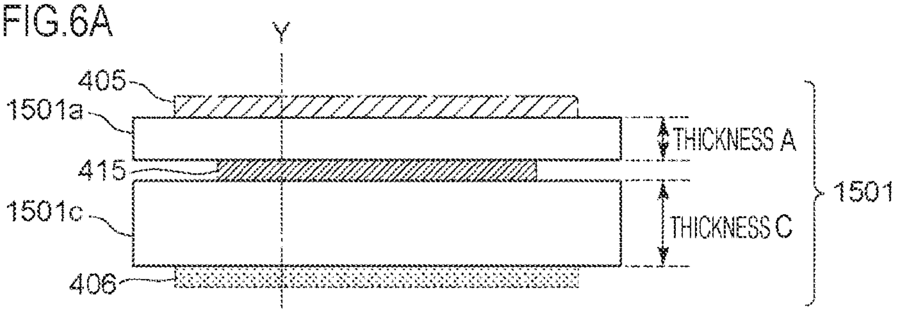
FIGS. 6A and 6B are diagrams illustrating a configuration of a circuit board in embodiment 2.
Figure 6B:
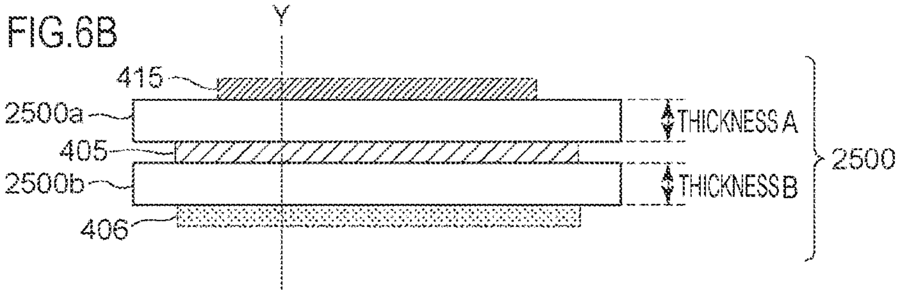

FIG. 6A is a cross-sectional view of a circuit board 1501 of comparative example 2 and FIG. 6B is a cross-sectional view of a circuit board 2500 of embodiment 2. The circuit board 2500 in embodiment 2 is a 2-level board. The above-described insulation structures of safety requirements are also required in the thickness direction of the board.

In FIG. 6A which represents a comparative example, all of the third potential group 405, the first potential group 415 and the second potential group 406 are present on a straight line Y and they are disposed in the order of the third potential group 405, the first potential group 415 and the second potential group 406. In this case, a thickness of a circuit board 1501*a* which is required between the first potential group 415 and the third potential group 405 is a thickness A and a thickness of a circuit board 1501*c* which is required between the first potential group 415 and the second potential group 406 is a thickness C (>thickness A). Accordingly, the circuit board 1501 requires a minimum thickness of A+C.

In FIG. 6B which represents embodiment 2, all of the first potential group 415, the third potential group 405 and the second potential group 406 are present on the straight line Y and they are disposed in the order of the first potential group 415, the third potential group 405 and the second potential group 406. In this case, a thickness of the circuit board 2500*a* which is required between the first potential group 415 and the third potential group 405 is a thickness A and a thickness of the circuit board 2500*b* which is required between the third potential group 405 and the second potential group 406 is a thickness B (<thickness C). Accordingly, although the circuit board 2500 requires a minimum thickness of A+B, this thickness is less than the thickness required for the circuit board 1501.

As described above, it is possible to reduce the thickness of the circuit board 2500 according to the present embodiment.

Embodiment 3

Figures 7A, 7B, 7C:
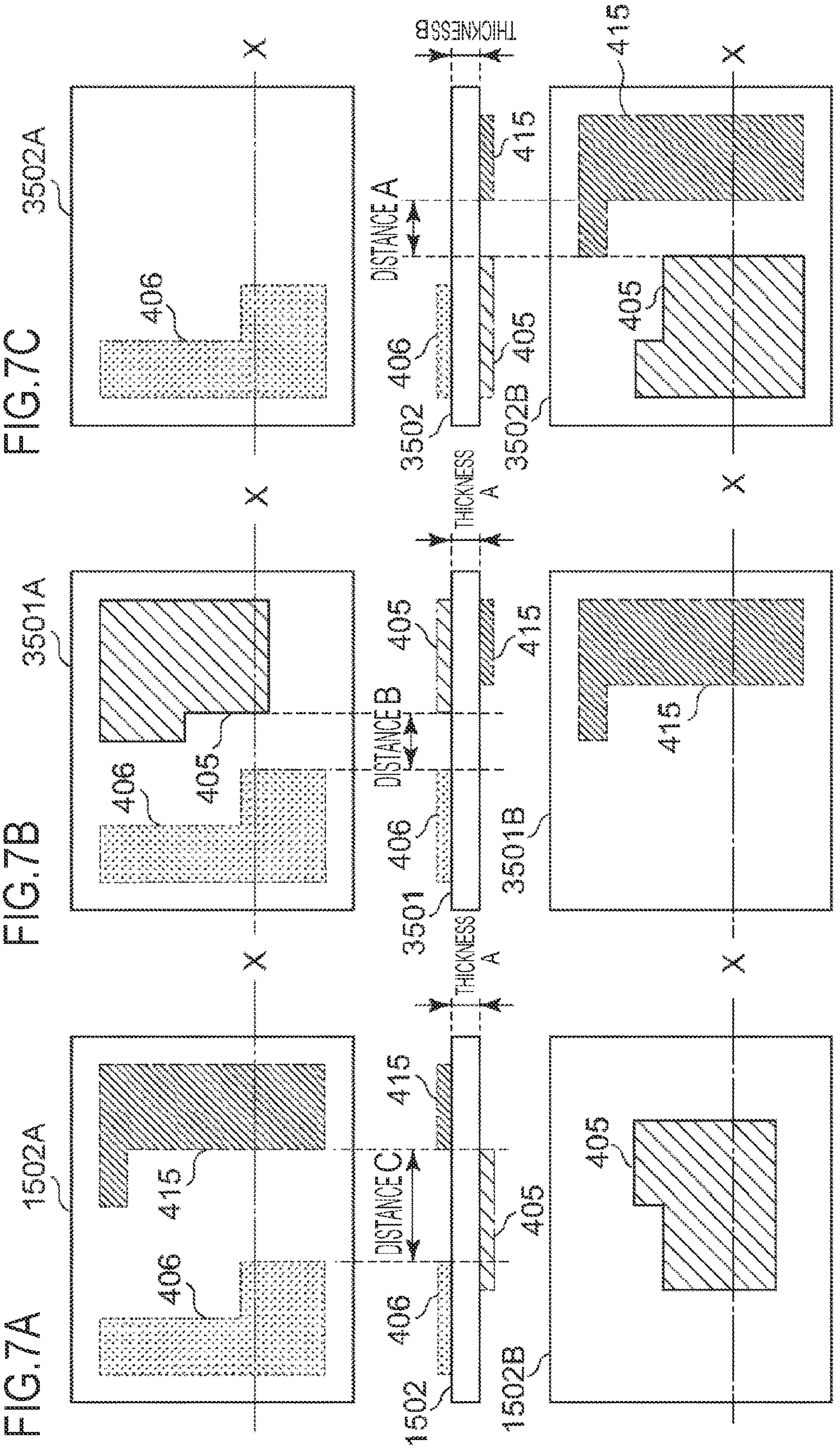
FIGS. 7A to 7C are diagrams illustrating a configuration of a circuit board in embodiment 3.

FIG. 7A is a plan view of the surface of a circuit board 1502 of comparative example 3, a cross-sectional view of the circuit board 1502 and a plan view of the back of the circuit board 1502. FIGS. 7B and 7C are plan views of the surfaces of circuit boards 3501 and 3502 of embodiment 3, cross-sectional views of the circuit boards 3501 and 3502 and plan views of the backs of the circuit boards 3501 and 3502. The circuit boards 3501 and 3502 in embodiment 3 are both-sided boards. For safety requirements, distance C>distance A and distance C>distance B are required in the surface direction as in embodiment 1 and thickness C>thickness A and thickness C>thickness B are required in the thickness direction of the board as in embodiment 2.

In FIG. 7A which represents comparative example 3, the first potential group 415 and the second potential group 406 are disposed on a first surface 1502A of the circuit board 1502 and the third potential group 405 is disposed on a second surface 1502B which is the back. Since the first potential group 415 and the second potential group 406 are disposed on the first surface 1502A, distance C is required and thus the area of the circuit board 1502 increases.

In FIG. 7B which presents embodiment 3, the second potential group 406 and the third potential group 405 are disposed on a first surface 3501A of the circuit board 3501 and the first potential group 415 is disposed on a second surface 3501B which is the back. According to this arrangement, a distance between neighboring potential groups becomes distance B and thus the area of the circuit board 3501 can be reduced to be less than that of the configuration of FIG. 7A.

In FIG. 7C which represents a modified example of embodiment 3, the second potential group 406 is disposed on a first surface 3502A of the circuit board 3502 and the first potential group 415 and the third potential group 405 are disposed on a second surface 3502B which is the back. According to the arrangement in which the first potential group 415 and the third potential group 405 are disposed on the second surface 3502B, a distance between neighboring potential groups becomes distance A and thus the area of the circuit board 3502 can be reduced to be less than that of the configuration of FIG. 7A.

As described above, the first potential group 415 is disposed on the first surface of the circuit board, the second potential group 406 is disposed on the second surface which is the back of the first surface and the third potential group 405 is disposed on at least one of the first and second surfaces in the apparatus of the present embodiment.

In addition, the second potential group 406 is not provided immediately underneath the area in which the first potential group 415 is provided.

Further, the third potential group 405 is disposed immediately underneath the area in which the first potential group 415 is provided or the area in which the second potential group 406 is provided.

Meanwhile, if an insulating distance necessary between the first potential group 415 and the second potential group 406 can be secured as thickness A or thickness B, the first potential group 415 may be disposed immediately behind the back of the second potential group 406 having the circuit board 500 sandwiched therebetween.

In embodiments 2 and 3, when potential groups are present on the edge (near the flange) of the circuit board 500 or a through-hole penetrating the surface and the back is present in the board, it is also necessary to consider a creeping distance routed to the surface and the back at such positions.

Embodiment 4

Next, a configuration effective for miniaturizing a connector will be described.

Figure 8A:
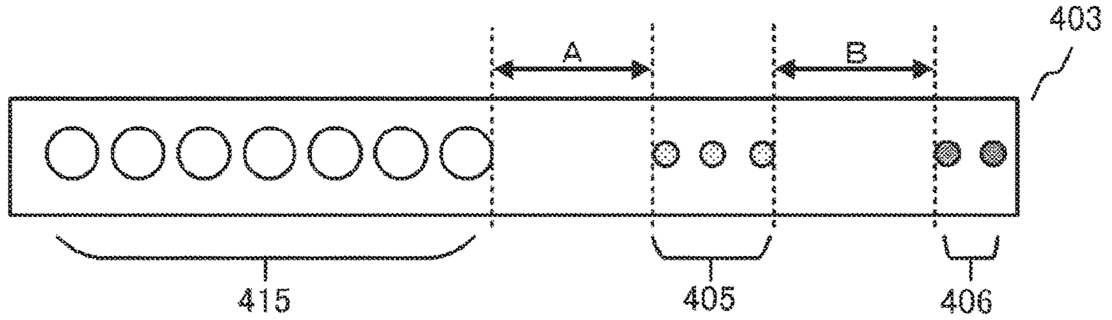
FIGS. 8A to 8C are cross-sectional views of a connector in embodiment 4 and a comparative example.
Figure 8B:
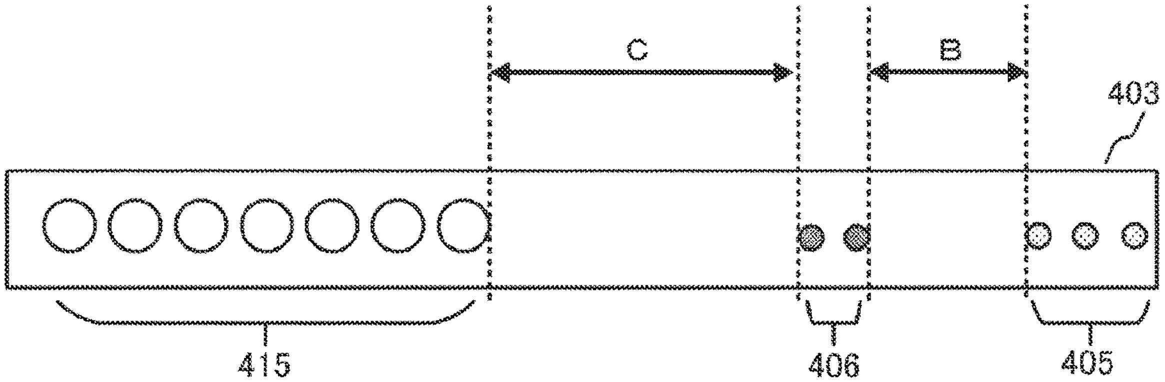
Figure 8C:
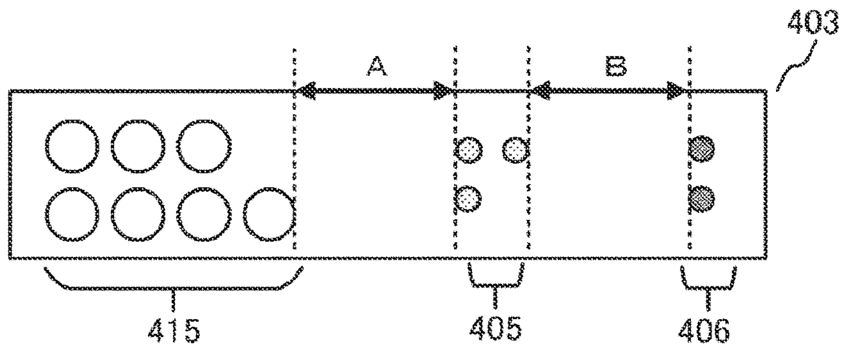

FIGS. 8A to 8C are schematic cross-sectional views of the connector 403 illustrated in FIG. 4 and shows a configuration in which connector parts respectively corresponding to the first potential group (first circuit) 415, the second potential group (second circuit) 406 and the third potential group (third circuit) 405 are mixed.

That is, a connector configuration in which the connector parts corresponding to the respective potential groups are disposed within the single connector 403 is provided in the present embodiment. The connector 403 is composed of a male connector including pins provided on any one of the fixing unit 200 and the main body of the image forming apparatus 100, and a female connector including pin holes corresponding to the pins and provided on the other side. Circles in FIGS. 8A to 8C and 9 schematically show arrangement of pins or pin holes in each connector part. Although not shown, the connector 403 includes a fitting shape part for positioning the male connector and the female connector in order to maintain a connection state of the pins and pin holes.

A predetermined distance necessary for insulation between the connector part of the first potential group 415 and the connector part of the third potential group 405 (a shortest distance between pins included in the connector part of the first potential group 415 and pins included in the connector part of the third potential group 405) is assumed to be A. Similarly, a predetermined distance necessary for insulation between the connector part of the third potential group 405 and the connector part of the second potential group 406 (a shortest distance between pins included in the connector part of the third potential group 405 and pins included in the connector part of the second potential group 406) is assumed to be B. Further, predetermined distance necessary for insulation between the connector part of the first potential group 415 and the connector part of the second potential group 406 (a shortest distance between pins included in the connector part of the first potential group 415 and pins included in the connector part of the second potential group 406) is assumed to be C. Here, a relationship of A=B<C is present. A and B are assumed to be insulation distances corresponding to basic insulation. C is assumed to be an insulation distance corresponding to reinforced insulation.

FIG. 8A is a schematic cross-sectional view showing an arrangement configuration of connector parts corresponding to respective potential groups within the connector 403 in embodiment 1. The connector parts are disposed in the order of the connector part of the first potential group 415, the connector part of the third potential group 405 and the connector part of the second potential group 406 from the left of the cross section of the connector. That is, the connector part of the first potential group 415 is disposed one side of the connector part of the third potential group 405 and the connector part of the second potential group 406 is disposed on the other side that is the opposite side. This is an example in which the potential groups are disposed such that the sum of distances between potential groups is minimized while the sum of distances between potential groups becomes A+B and a distance necessary for insulation between potential groups is secured. In FIG. 8A, a distance necessary for insulation can be further reduced by removing a metal part necessary for a wire between potential groups. For example, when the potential group arrangement configuration shown in FIG. 8A is realized using a connector including a larger number of pins than the number necessary for each potential group, free pins that are not used in each potential group and a metal part provided corresponding to the free pins are removed from the connector and used. Accordingly, it is possible to realize a potential group arrangement configuration in which a required insulation distance has been secured using a more compact connector (a connector having fewer pins).

FIG. 8B is a schematic cross-sectional view showing a connector arrangement within the connector 403 in a comparative example. In the comparative example, the connector parts are disposed in the order of the connector part of the first potential group 415, the connector part of the second potential group 406 and the connector part of the third potential group 405 from the left of the cross section of the connector. In such an arrangement, the sum of distances between potential groups is C+B and thus becomes larger than the sum of the distances A+B shown in FIG. 8A. Accordingly, a required connector size increases.

FIG. 8C is a diagram showing a cross section when pins and pin holes are arranged in two rows within the connector 403. The first row and the second row are arranged such that they become the same potential and the distance between the first row and the second row decreases. In addition, the connector parts are disposed in the order of the connector part of the first potential group 415, the connector part of the third potential group 405 and the connector part of the second potential group 406 from the left of the cross section of the connector as in FIG. 8A. According to this arrangement, it is possible to minimize the sum of distances between potential groups while securing a distance necessary for insulation between potential groups.

Therefore, according to the circuit configuration of the present embodiment, it is possible to promote miniaturization of the connector and the fixing device.

Meanwhile, the arrangement illustrated in embodiment 4 is merely an example of an arrangement in which a predetermined distance necessary electrical insulation between potential groups is secured and the sum of distances between potential groups is minimized. Various configuration can be employed depending on combinations of the number of potential groups and the size of a distance necessary for insulation.

Embodiment 5

Figure 9A:
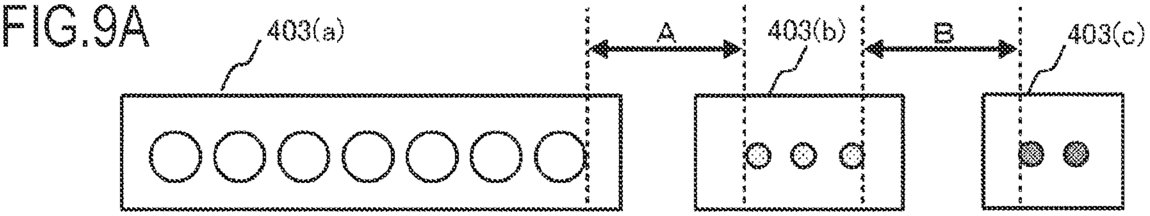
FIGS. 9A to 9C are cross-sectional views of a connector in embodiment 5.
Figure 9B:
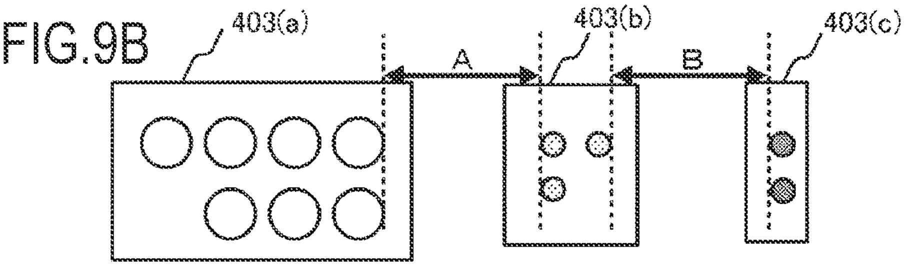
Figure 9C:
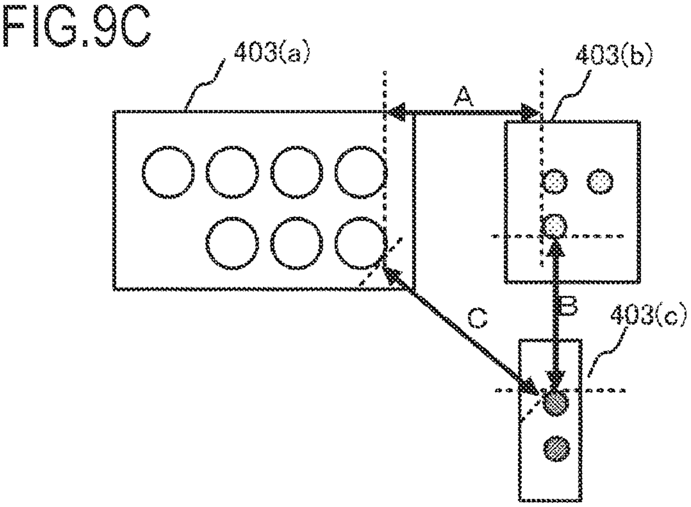

FIGS. 9A to 9C are diagrams illustrating a connector arrangement in embodiment 5. In the present embodiment, a configuration including a plurality of connectors 403 respectively corresponding to potential groups is provided. That is, an independent connector 403 is provided for each potential group.

Description of common components in embodiments 4 and 5 is omitted in embodiment 5. Matters which are not particularly described in embodiment 5 are the same as those in embodiment 4.

FIG. 9A is a diagram showing an arrangement of connectors 403(*a*), 403(*b*) and 403(*c*) on a straight line. The first potential group 415 is connected to the connector 403(*a*), the third potential group 405 is connected to the connector 403(*b*) and the second potential group 406 is connected to the connector 403(*c*). As in embodiment 1, it is assumed that a predetermined distance necessary for insulation between the first potential group 415 and the third potential group 405 is A. Likewise, it is assumed that a predetermined distance necessary for insulation between the third potential group 405 and the second potential group 406 is B and a predetermined distance necessary for insulation between the first potential group 415 and the second potential group 406 is C. Here, the relationship of A=B<C is also present as in embodiment 1.

As illustrated in FIG. 9A, it is possible to obtain the same effect as that of embodiment 1 by arranging the connectors in the order of the first potential group 415, the third potential group 405 and the second potential group 406 from the left of the cross section of the connectors even when the connectors are separated for respective potential groups. That is, it is possible to arrange the connectors in a minimum space while securing distances necessary for insulation between potential groups.

FIG. 9B is a diagram showing a cross section when pins and pin holes are arranged in two rows within each connector. The first row and the second row are arranged such that they become the same potential and the distance between the first row and the second row decreases. In addition, the connectors are disposed in the order of the first potential group 415, the third potential group 405 and the second potential group 406 from the left of the cross section of the connector as in FIG. 9A. According to this arrangement, it is possible to arrange the connectors in a minimum space while securing distances necessary for insulation between potential groups.

FIG. 9C is a diagram showing an arrangement of connectors 403(*a*), 403(*b*) and 403(*c*) on a triangle. Here, an arrangement for minimizing the sum of distances between potential groups while securing distances necessary for insulation between potential groups is an arrangement in which the connectors 403(*a*), 403(*b*) and 403(*c*) are arranged such that the distance C becomes an oblique side, as shown in FIG. 9C. That is, the connectors are disposed such that an isosceles triangle with a first side having the length of A and a second side having the length of B as equal sides and a third side having the length of C as a bottom side is drawn between the connectors 403(*a*), 403(*b*) and 403(*c*).

The connector configuration illustrated in embodiment 5 is merely an example. For example, a configuration in which the first potential group 415 and the third potential group 405 are included in one connector and the second potential group 406 is included in a separate connector may be provided. That is, various configurations can be employed depending on combinations of the number of potential groups and the sizes of distances necessary for insulation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2018-214524, filed Nov. 15, 2018, No. 2018-211664, filed Nov. 9, 2018, and No. 2019-196146, filed Oct. 29, 2019, which are hereby incorporated by reference herein in their entirety.

What is claimed is:

1. An image forming apparatus for forming a toner image on a recording material, comprising:

a fixing unit that thermally fixes the toner image formed on the recording material onto the recording material, the fixing unit including (i) a heater having a plurality of heat generating blocks arranged in a longitudinal direction of the heater, (ii) a plurality of temperature detection elements each of which detects temperature of an area of the fixing unit corresponding to one of the plurality of heat generating blocks, and (iii) an element connecting a plurality of signal lines of the plurality of temperature detection elements;

a circuit board provided with a power control circuit for controlling power supplied to the heater, the circuit board including a central processing unit for controlling the power supplied to the heater; and a connector which electrically connects the fixing unit to the circuit board, wherein a number of signal lines extended from the element connecting the plurality of signal lines of the plurality of temperature detection elements to the central processing unit is less than a number of the plurality of signal lines of the plurality of temperature detection elements, wherein the number of signal lines extended from the element connecting the plurality of signal lines of the plurality of temperature detection elements is one, and the one signal line extended from the element is electrically connected to the circuit board through the connector, wherein the fixing unit is detachably attached to an apparatus main body and wherein the element connecting the plurality of signal lines of the plurality of temperature detection elements is provided on the fixing unit.

2. The image forming apparatus according to claim 1, wherein the element connecting the plurality of signal lines of the plurality of temperature detection elements is an AD converter.

3. The image forming apparatus according to claim 1, further comprising an insulating coupler provided on the circuit board, wherein a signal from the element connecting the plurality of signal lines of the plurality of temperature detection elements transmits to the central processing unit via the connector and the insulating coupler.

4. The image forming apparatus according to claim 1, wherein the fixing unit includes a cylindrical film and a roller contacting an outer surface of the film, wherein the heater is located in an inner space of the film, and wherein a fixing nip portion for nipping and conveying the recording material is formed between the film and the roller by nipping the film between the heater and the roller.

* * * * *